March 23, 1948. J. E. HUBER 2,438,286
FILM RETAINER
Filed Sept. 11, 1945 2 Sheets-Sheet 2
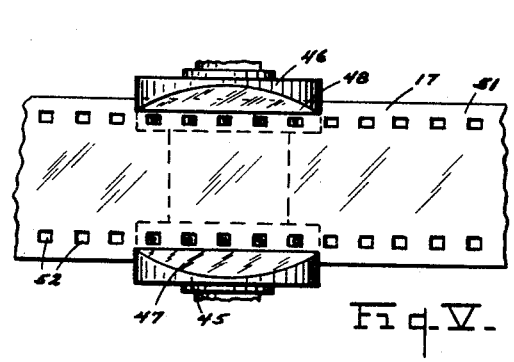
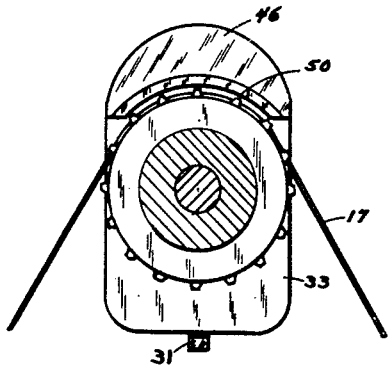
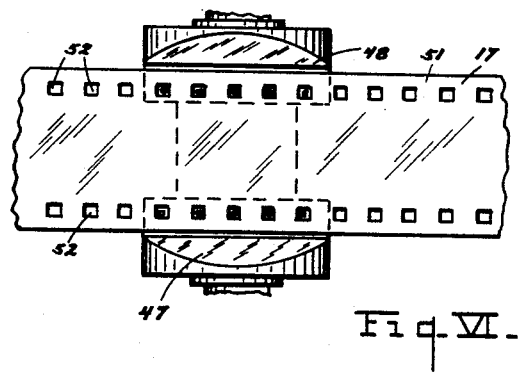
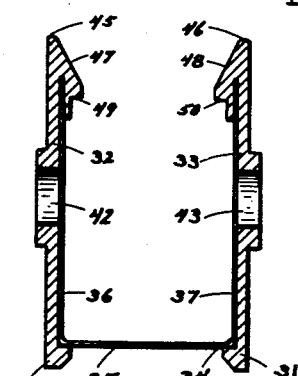
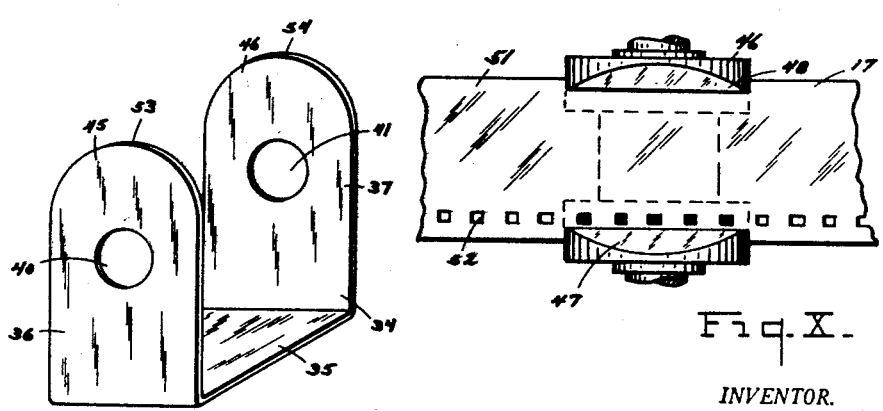
INVENTOR.
JOHN EUGENE HUBER.
BY
Joseph B. Lindecker
ATT'Y.

Patented Mar. 23, 1948

2,438,286

UNITED STATES PATENT OFFICE 2,438,286

FILM RETAINER

John Eugene Huber, Cincinnati, Ohio, assignor to Illinois Watch Case Co., Elgin, Ill., a corporation of Illinois Application September 11, 1945, Serial No. 615,563

5 Claims. (Cl. 271—2.3)

This invention relates particularly to motion picture machines although not limited to this use alone.

Certain features of this invention relate to the provision of simple and effective sprocket guide means for retaining film in engagement with a sprocket, the guide or guides affording a continuous means for retaining the film at its edge portions upon the sprocket and being adapted for economical manufacture and assembly, and embodying in its preferred form a plurality of similar substantially flat side guides constructed to be held in position and function in combination with a substantially U-shaped resilient, flat spring member.

In the equipment now in use on a picture projector, for example, a reel of film is placed upon the upper reel arm spindle and a few feet of film is unwound for threading purposes. Various means such as knobs attached to sprocket guards are raised or lowered and held in extended position so that the film may be inserted between the guard and the sprocket whereby the film perforations are positioned over the sprocket teeth, after which the guard or guards are returned to the closed position to lock the film in running position. The above procedure requires considerable time and the use of both hands within a projector housing of limited space, this being a disadvantage.

The present invention is directed to the use of guides or film retainers on film equipment using 35, 16, or 8 mm. film and which is used in its normal manner, the film being arranged upon the sprocket, and over the sprocket teeth on one or both ends thereof with greater ease and within a shorter period of time. In order to thread the film with this invention all that is necessary for the operator to do is to place the film parallel with the sprocket and between the top slanting surfaces of the film retainers, and pull downwardly upon the end portions of the film extending over and beyond the sprocket, whereby the film will snap past the film retainers and into the desired position upon the sprocket, and will be held thereon during normal operation of the film equipment, such as a motion picture machine or the like.

With these features in view this invention consists in certain features of novelty in the construction, combination, and arrangement of parts by which the said features and certain other features, hereinafter appearing, are effected, all as fully described with reference to the accompanying drawings and more particularly pointed out in the appended claims.

In the said drawings—

Figure I is a partial side view of a motion picture projector embodying this invention with parts removed.

Figure II is a partial end elevation, partially in section, of a film sprocket with film retaining means associated therewith.

Figure III is a view similar to Figure II with a strip of film shown in position above the film retaining members.

Figure IV is a view similar to Figure III with the film positioned between the film retainer edge portions and showing said retainers and spring member in extended position.

Figure V is a diagrammatic fragmentary plan view of a strip of film placed in position on a sprocket between its guide members and related parts.

Figure VI is a view similar to Figure V with the guide retaining members extended so that the film may be placed upon or removed from a sprocket member.

Figure VII is a sectional view of a sprocket member with a film retainer and a strip of film in assembled position.

Figure VIII is a sectional view of two film retainers, showing the U-shaped spring member in normal position.

Figure IX is a perspective view of a substantially U-shaped flat spring member for use herewith.

Figure X is a view similar to Figure V and showing a film with perforations on one side only.

Like characters of reference indicate like parts in the several views.

In order that the nature of my invention as applied to a motion picture projection machine may be clearly understood, I will further premise (a) a typical motion picture machine employing in general the practice which is at present approved and (b) what are considered the essential features of the intermittent driving mechanism and the framing mechanism employed therein.

Referring to the drawings 10 designates a lamp housing with film gate 11 and film driving sprockets 12, 13 and 14. Disposed in relation to said parts are a pair of reels, 15 and 16, with film 17 arranged thereon. The film 17 is fed from reel 15 past sprocket 12, over roller 18, thru opening in gate 11, over sprocket 13, down and around sound drum 19, up over sprocket 14 and downwardly for rewinding upon reel 16. Said film sprockets are mounted upon respective shafts 20, 21 and 22.

The sprockets are provided as usual with teeth 23 adjacent one or both ends of the film engaging portions thereof for engagement with marginal perforations of a film in a usual manner, the teeth being disposed in adjacent spaced relation about the periphery thereof. The sprockets are provided with externally reduced portions 25 between the toothed marginal film engaging portions therein in order that the intermediate picbearing against said guide members to hold said portions flexibly adjacent said sprocket for the purposes set forth.

5. Film sprocket mechanism comprising: a sprocket wheel; a mounting therefor; film retainer guide members having portions extending toward each other and provided with film retainer surfaces disposed over the marginal portions of said wheel; mountings for said members; and a substantially U-shaped spring between said retainer members and having portions bearing against said guide members to hold said portions flexible adjacent said sprocket for the purposes set forth.

JOHN EUGENE HUBER.

REFERENCES CITED

The following references are of record in the file of this patent:

FOREIGN PATENTS

| Number | Country | Date |
|---|---|---|
| 132,161 | Austria | Mar. 10, 1933 |
| 582,658 | Germany | Aug. 21, 1933 |

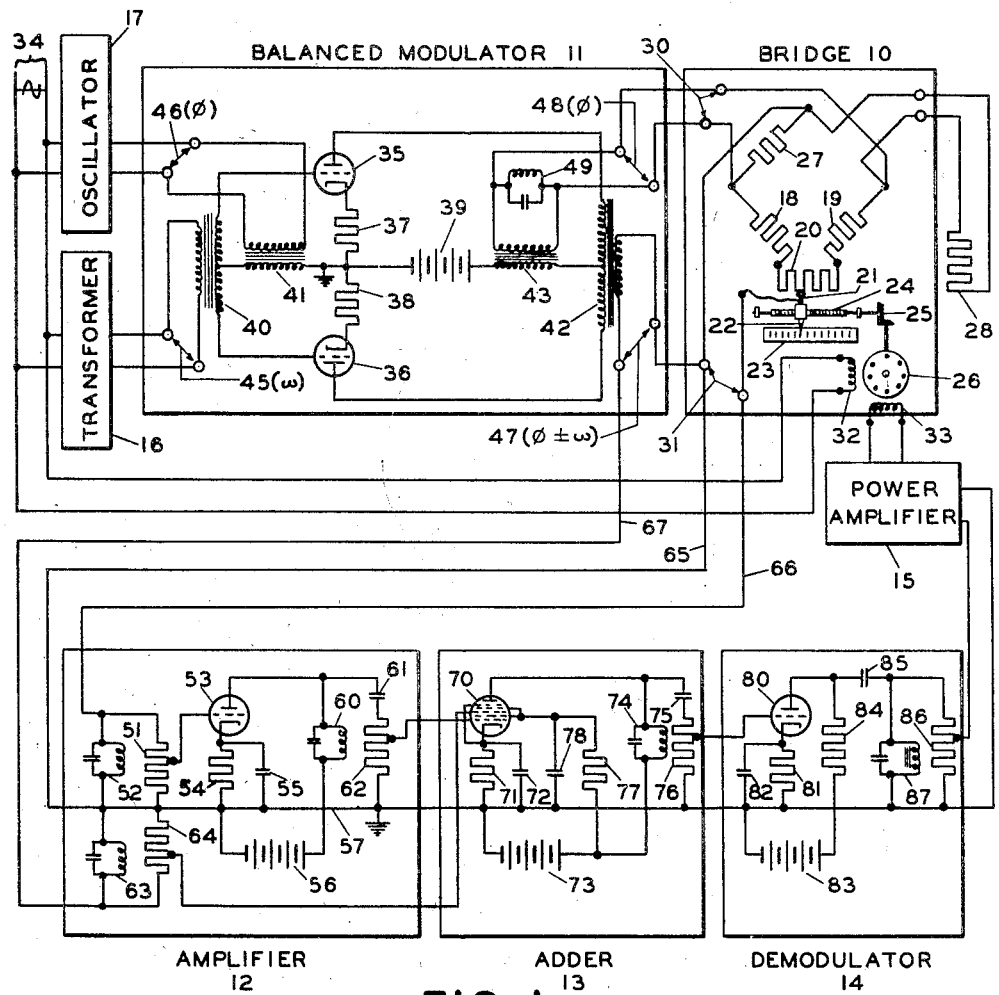
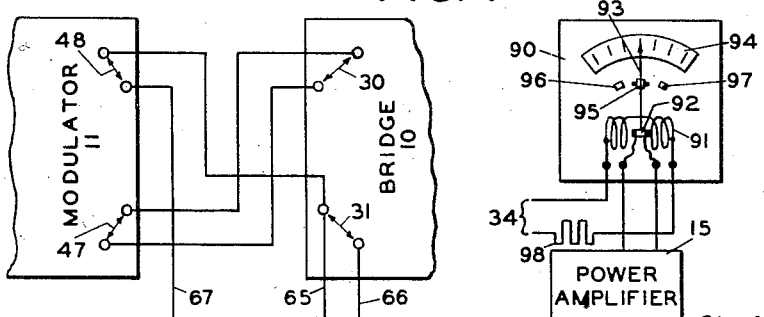
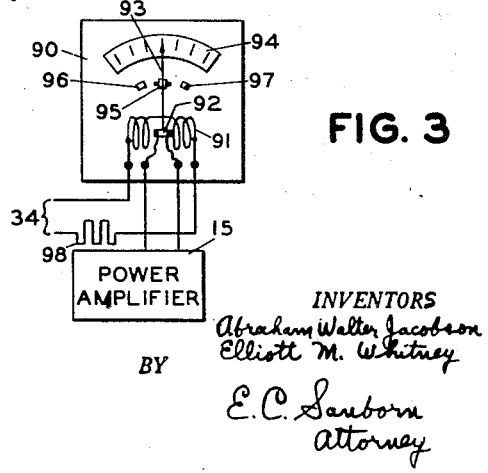
INVENTORS
Abraham Walter Jacobson
Elliott M. Whitney
BY
E. C. Sanborn
Attorney